Patented Aug. 8, 1944

2,355,140

UNITED STATES PATENT OFFICE 2,355,140

SEPARATION OF ALDEHYDE-KETONE MIXTURES

Joseph E. Bludworth, Cumberland, Md., assignor to Celanese Corporation of America, a corporation of Delaware No Drawing. Application December 6, 1940, Serial No. 368,933

10 Claims. (Cl. 260—530)

This invention relates to the separation of mixtures of liquid organic compounds and relates more particularly to the separation of mixtures of aldehydes and ketones.

An object of my invention is the provision of a method for the separation of mixtures of aldehydes and ketones having relatively close boiling points.

Another object of my invention is the provision of a method for the separation of mixtures of aldehydes and ketones whereby the components are recovered with a high degree of efficiency.

Other objects of my invention will appear from the following detailed description.

In separating mixtures of organic liquids it is frequently found that components of the mixture have such closely spaced boiling points that it is practically impossible to separate them by the ordinary methods of fractional distillation. Such separations demand columns of the utmost efficiency and require an inordinate amount of fractionation and refractionation before the separated components even approximate relatively pure liquids. Where components of the mixture form azeotropes, their separation by distillation methods is out of the question. As a solution to the problem of separating mixtures of aldehydes and ketones the formation of aldehyde addition compounds or the polymerization of the aldehydes has been suggested. This latter expedient is quite uneconomic since the polymerization produces a resin which is of no value and hence only the ketone component is recovered.

I have now discovered that the components of mixtures of aldehydes and ketones may be recovered in a highly efficient manner by controllably oxidizing the mixture so that the aldehydic component is oxidized to the corresponding acid and then separating the components by fractional distillation. By treating the reaction mixture in this manner, the boiling point of the aldehydic component is markedly increased and the resulting acid and ketone mixture may be separated by the usual fractionation methods.

The oxidation of the aldehyde-ketone mixture may be carried out by adding an oxidation catalyst to the liquid mixture and then passing the mixture down a packed column or down a fractionating column countercurrent to a stream of air or oxygen. A portion of the liquids from the base of the column may be recycled through the column in company with the liquid mixture being fed at the top. Accordingly, the aldehydes present are oxidized to the corresponding acids and the resulting acid-ketone mixture may be separated by fractionation. Since the ketones are unaffected by the oxidation, they are recovered with only an insignificant loss, the recovery being practically theoretical. The reaction is exothermic and in order to keep the temperature within the desired limits, the recycled liquid from the base of the column may be cooled before recycling in admixture with the liquid mixture being fed at the top.

Catalysts comprising the oxides, acetates or other lower fatty acid salts of cobalt, copper, or manganese or mixtures of said cobalt, copper or manganese compounds may be used in the oxidation reaction. The catalyst may be added to the aldehyde-ketone mixture in amounts varying from 0.5% to 5% and this mixture fed to the oxidation column.

The temperature near the base of the reaction column may be permitted to reach from 50° to 100° C. depending upon the particular aldehyde-ketone mixture which is being oxidized. A desirable degree of control over this temperature may be maintained by the degree of cooling the recycle is subjected to and the rate at which the cooled recycle is returned to the column. The temperature is preferably maintained at about 50° C.

When air is used in place of oxygen, the oxidation reaction may be carried out at pressures above atmospheric and at higher temperatures than those mentioned above. Thus, when the pressure on the system is maintained at 75 lbs./sq. inch the temperature of the oxidation reaction may be 100° C. Pressures of from atmospheric to 200 lbs./sq. inch and temperatures of from 30° to 150° C. are suitable.

My process is applicable in separating numerous aldehyde-ketone mixtures in which the boiling points of the components are too close for economic separation by merely fractionally distilling. Thus, for example, acetone (B. P. 55° C.) may be separated from propionic aldehyde (B. P. 49° C.) by suitably oxidizing the aldehyde to propionic acid (B. P. 140° C.) in the manner described. The resulting acid-ketone mixture may now be easily separated by distillation due to the wide variation in the boiling points of the components after oxidation. In the same way acetone may be separated from acrylic aldehyde (B. P. 52° C.) by converting it to the corresponding acid (B. P. 140° C.), from iso butyric aldehyde (B. P. 63° C.) by converting it to isobutyric acid (B. P. 155° C.) and from methacrylic aldehyde (B. P. 69° C.) by converting it to methacrylic acid (B. P. 162° C.) and then fractionally distilling the resulting mixture. In the same way butyl aldehyde (B. P. 75° C.) may be separated from methyl ethyl ketone (B. P. 78° C.), iso-valeric aldehyde (B. P. 92° C.) or diacetyl (B. P. 88° C.) from methyl iso-propyl ketone (B. P. 94° C.) and n-valeric aldehyde (B. P. 102° C.) from diethyl ketone (B. P. 101° C.) or methyl n-propyl ketone (B. P. 102° C.). It thus can be seen that my process is applicable for the separation of innumerable aldehyde-ketone mixtures which cannot be separated by ordinary fractional distillation. In a case where unsaturated aldehydes are being oxidized, any tendency to polymerize may be inhibited by the addition of a polymerization inhibitor such as hydroquinone.

In order further to illustrate my invention but without being limited thereto the following example is given:

*Example*

1000 parts of an aldehyde-ketone mixture consisting of 70% acetone and 30% acrylic aldehyde containing 10 parts of cobalt acetate is passed in one hour through a packed column. In the same period of time oxygen 50% in excess of the theoretical is passed up the packed column and the unreacted oxygen is vented through the top. The temperature at the base of the column is maintained at about 50° C. by recycling part of the liquid reaction mixture from the base of the column after being cooled to about 10° C. The recycle is about 10 times the rate at which the fresh feed is fed to the column. At the end of the oxidation reaction 700 parts of acetone were recovered by fractional distillation and subtantially all the acrylic aldehyde was recovered as acrylic acid (B. P. 140° C.) with only a slight loss due to polymerization.

It is to be understood that the foregoing detailed description is given merely by way of illustration and that many variations may be made therein without departing from the spirit of my invention.

Having described my invention, what I desire to secure by Letters Patent is:

1. Process for the separation of aldehyde-ketone mixtures which are difficultly separable by distillation whereby the ketone is recovered in the form originally present in the mixture, which comprises subjecting such aldehyde-ketone mixture to oxidation in the presence of an oxidation catalyst with a gas containing free oxygen under such conditions as to cause the conversion of the aldehyde present into the corresponding acid, and thereafter recovering the ketone from the product of said oxidation by distillation.

2. Process for the separation of aldehyde-ketone mixtures which are difficultly separable by distillation whereby the ketone is recovered in the form originally present in the mixture, which comprises subjecting such aldehyde-ketone mixture in the liquid phase to oxidation in the presence of an oxidation catalyst with a gas containing free oxygen under such conditions as to cause the conversion of the aldehyde present into the corresponding acid, and thereafter recovering the ketone from the product of said oxidation by distillation.

3. Process for the separation of aldehyde-ketone mixtures which are difficultly separable by distillation whereby the ketone is recovered in the form originally present in the mixture, which comprises subjecting such aldehyde-ketone mixture in the liquid phase to oxidation at elevated temperature in the presence of an oxidation catalyst with a gas containing free oxygen under such conditions as to cause the conversion of the aldehyde present into the corresponding acid, and thereafter recovering the ketone from the product of said oxidation by distillation.

4. Process for the separation of aldehyde-ketone mixtures which are difficultly separable by distillation whereby the ketone is recovered in the form originally present in the mixture, which comprises reacting at elevated temperature and in the presence of an oxidation catalyst such aldehyde-ketone mixture with gaseous oxygen under such conditions as to cause the conversion of the aldehyde present into the corresponding acid, and thereafter recovering the ketone from the product of said oxidation by distillation.

5. Process for the separation of aldehyde-ketone mixtures which are difficultly separable by distillation whereby the ketone is recovered in the form originally present in the mixture, which comprises passing such aldehyde-ketone mixture in liquid phase containing an oxidation catalyst, at elevated temperature, counter-current to a stream of gaseous oxygen under such conditions as to cause the conversion of the aldehyde present into the corresponding acid, and thereafter recovering the ketone from the product of said oxidation by distillation.

6. Process for the separation of aldehyde-ketone mixtures which are difficultly separable by distillation whereby the ketone is recovered in the form originally present in the mixture, which comprises passing such aldehyde-ketone mixture in liquid phase containing an oxidation catalyst, at a temperature of about 50° C., counter-current to a stream of gaseous oxygen under such conditions as to cause the conversion of the aldehyde present into the corresponding acid, and thereafter recovering the ketone from the product of said oxidation by distillation.

7. Process for the separation of aldehyde-ketone mixtures which are difficultly separable by distillation whereby the ketone is recovered in the form originally present in the mixture, which comprises passing such aldehyde-ketone mixture in liquid phase containing about 1% of cobalt acetate as the oxidation catalyst, at a temperature of about 50° C., counter-current to a stream of gaseous oxygen under such conditions as to cause the conversion of the aldehyde present into the corresponding acid, and thereafter recovering the ketone from the product of said oxidation by distillation.

8. Process for the separation of aldehyde-ketone mixtures which are difficultly separable by distillation whereby the ketone is recovered in the form originally present in the mixture, which comprises passing such aldehyde-ketone mixture in liquid phase containing an oxidation catalyst, at elevated temperature, counter-current to a stream of gaseous oxygen, while recycling a portion of the reactants, under such conditions as to cause the conversion of the aldehyde present into the corresponding acid, and thereafter recovering the ketone from the product of said oxidation by distillation.

9. Process for the separation of aldehyde-ketone mixtures which are difficultly separable by distillation whereby the ketone is recovered in the form originally present in the mixture, which comprises passing such aldehyde-ketone mixture in liquid phase containing an oxidation catalyst, at a temperature of about 50° C., counter-current to a stream of gaseous oxygen, while recycling a portion of the reactants, under such conditions as to cause the conversion of the aldehyde present into the corresponding acid, and thereafter recovering the ketone from the product of said oxidation by distillation.

10. Process for the separation of aldehyde-ketone mixtures which are difficultly separable by distillation whereby the ketone is recovered in the form originally present in the mixture, which comprises passing such aldehyde-ketone mixture in liquid phase containing about 1% of cobalt acetate as the oxidation catalyst, at a temperature of about 50° C., counter-current to a stream of gaseous oxygen, while recycling a portion of the reactants, under such conditions as to cause the conversion of the aldehyde present into the corresponding acid, and thereafter recovering the ketone from the product of said oxidation by distillation.

JOSEPH E. BLUDWORTH.